United States Patent [19]

Evers et al.

[11] 4,130,625
[45] Dec. 19, 1978

[54] RECOVERY AND PURIFICATION OF IRIDIUM

[75] Inventors: Ann P. Evers, Roodepoort; Roderick I. Edwards, Honeydew; Monika M. Fieberg, Johannesburg, all of South Africa

[73] Assignee: The National Institute for Metallurgy, Randburg, South Africa

[21] Appl. No.: 806,818

[22] Filed: Jun. 15, 1977

[30] Foreign Application Priority Data

Jun. 21, 1976 [ZA] South Africa ................. 76/3681

[51] Int. Cl.² ........................................... C01G 55/00
[52] U.S. Cl. ................................. 423/22; 75/101 BE
[58] Field of Search ..................... 75/101 BE, 121; 423/97 R, 22, 658.5

[56] References Cited

U.S. PATENT DOCUMENTS

| 3,979,207 | 9/1976 | MacGregor | 75/121 |
| 3,999,983 | 12/1976 | Grosbois | 75/121 |

FOREIGN PATENT DOCUMENTS 2555879 6/1976 Fed. Rep. of Germany ............. 75/121

Primary Examiner—Herbert T. Carter
Attorney, Agent, or Firm—Cushman, Darby & Cushman

[57] ABSTRACT

A method of recovering iridium from a solution thereof containing rhodium and impurities in the form of base metals comprising; oxidizing the iridium to the Ir(IV) oxidation state in an acid solution in the presence of chloride ions; removing the iridium chlorocomplexes formed using a suitable anion-exchange resin; washing the resin; treating the iridium with an aqueous solution of sulphur dioxide which is substantially free of chloride ions; and thereafter eluting the iridium complex formed from the resin using a suitable eluant.

9 Claims, No Drawings

RECOVERY AND PURIFICATION OF IRIDIUM

BACKGROUND OF THE INVENTION

This invention relates to the recovery and purification of iridium with reference to its removal from solutions containing rhodium and impurities such as base metals.

In this specification the term "base metal" refers to any metal impurity other than a member of the platinum group of metals.

Iridium is normally recovered together with other platinum group metals in the form of a platinum metal concentrate but generally forms a very minor constituent thereof. A typical ratio of platinum group metals to one another in such a concentrate would be:

Pt: 1
Pd: 0.5
Ru: 0.2
Rh: 0.1
Os, Ir: 0.02

Because of its low concentration the recovery and purification of iridium by known methods is difficult and often incomplete. These methods rely on the relative inertness of iridium to leaching in order to concentrate it into a smaller bulk with the other minor platinum group metals. It is then recovered by a series of dissolution/reprecipitation steps in which impurities are removed at each stage. The disadvantages of this process are mainly the resultant incomplete recovery of iridium at each stage which in turn necessitates recycling material to recover the iridium. Another problem with the presently used process evidences itself in the purification of the other platinum group metals, especially in the case of rhodium where iridium is often the most persistent impurity.

Many attempts to improve the recovery of iridium have been made using ion-exchange resins or solvents. All known techniques of which Applicants are aware, are based on the oxidation of Ir to the Ir(IV) oxidation state and the formation of the extractable complex IrCl$_6^{2-}$. This species is then extracted from the solution using an anion exchange resin or solvent, thus effecting a separation from metals, such as Rh which form less extractable complexes such as RhCl$_6^{3-}$, which do not form extractable complexes of this type. Resin ion-exchange is generally acknowledged as giving more complete extraction, while solvent extraction techniques are recognised as being more selective. Solvent extraction methods have been favoured up to now because resins have proved difficult to elute effectively, whereas stripping of solvents can easily be achieved.

Solvent extraction methods do however suffer generally from the abovementioned disadvantage that complete extraction is difficult to achieve without special techniques being involved. The reasons for the incomplete extraction associated with solvent extraction are not completely understood but the following two effects are considered by applicants to be of importance:

1. Commercial solvents almost always contain impurities or, are themselves, capable of reducing Ir(IV) to Ir(111) which may then be back-extracted albeit to a minor extent. Attempts have been made to counter the back extraction by maintaining highly oxidising conditions in the aqueous phase during extraction for example, by saturating the solution with chlorine. Such techniques tend to cause solvent degradation and are not easy to implement in large scale solvent extraction equipment.

2. Oxidation of Ir$^{(111)}$ to Ir$^{(IV)}$ in hydrochloric acid medium does not imply complete conversion to the extractable complex IrCl$_6^{2-}$. Ir$^{(111)}$ is usually found as a mixed, aquo-chloro complex of the form Ir(111)Cl$_x$(H$_2$O)$_y$ − (x−3), where $x + y = 6$. Oxidation of Ir(111) in HCl solution thus usually produces a mixture of Ir(IV) chloro-aqua complexes of similar form and having a charge of (x − 2). Because of the kinetic inertness of Ir(IV) interconversion of such complexes does not readily occur and as the full chloro-complex is the only one completely extracted by most organic solvents, complete extraction is thus not achieved. Where virtually complete extraction of iridium has been claimed in the literature, it is usually found that the starting solution has been prepared from an Ir(IV) salt which does not at all resemble a solution obtained by oxidising Ir(111) in solution.

This difficulty may be overcome by inserting, between each extraction stage, a "conditioning" step, in which the iridium remaining in the aqueous phase is heated and oxidised so that more of the full chlorocomplex is formed and can be extracted. In this way virtually complete extraction can be achieved, but such a process is cumbersome to implement in practice.

The more complete but less selective iridium extraction by solid ion-exchange resins as compared with solvent extraction may be explained as follows:

Typical ion-exchange resins will extract not only the full chloro-complex, but also mixed chloro-aqua complexes which are anionic in character. Thus, if an Ir(111) solution containing 85% of the Ir as IrCl$_6^{3-}$, 10% of the Ir as IrCl$_5$(H$_2$O)$^{2-}$ and 5% as IrCl$_4$(H$_2$O)$_2^-$, is oxidised to give the corresponding proportions of the Ir(IV) complexes, a resin will extract 95% of the Ir whereas a solvent will extract only 85%. Moreover, increasing substitution with aqua groups leads to increasing lability of these groups so that the equilibrium between the mono and di-aqua complexes can be established in a reasonable time whereas no equilibrium condition is obtained between the full chloro and mono aqua substituted complexes. Therefore, in resin ion-exchange, where the mono-substituted complex is effectively removed from solution, re-establishment of the equilibrium is possible and will lead to conversion of di- to mono-substituted complexes and to further extraction. Furthermore, it is easier to maintain oxidising conditions within a resin bed in practice than is the case with solvent extraction.

Because of the usually low concentrations of iridium present in feed solutions obtained in practice, ion-exchange is a more attractive process than solvent extraction in terms of the size and ease of operation of the equipment involved.

Thus, because of better extraction, ease of maintaining oxidising conditions and ease of operation, ion-exchange is preferable to solvent extraction for iridium recovery. However, solvent extraction is definitely to be preferred in terms of selectivity with respect to, and purification of, iridium.

Furthermore as mentioned previously, stripping of the iridium from solvents can easily be accomplished by contacting loaded solvents with a reducing solution. However, such techniques are not efficient when applied to anion exchange resins.

An object of the invention is therefore to provide a process for the recovery of iridium, the process providing good selectivity and high efficiency.

DETAILED DESCRIPTION OF THE INVENTION

According to this invention a method of recovering iridium from a solution thereof containing rhodium and impurities in the form of base metals comprises: oxidising the iridium to the Ir(IV) oxidation state in an acid solution in the presence of chloride ions:

removing the iridium chloro-complexes formed using a suitable ion-exchange resin;

washing the resin;

treating the iridium in the resin with an aqueous solution of sulphur dioxide which is substantially free of chloride ions; and thereafter eluting the iridium complex formed from the resin using a suitable eluant.

Further according to the invention the initial solution is acidified with hyrochloric acid; the oxidising effected at a temperature of about 40° C. using chlorine; the resin used is a strong base resin; the eluant is about 6 molar hydrochloric acid; and the washing of the resin is effected with about 0.1M hydrochloric acid.

The invention also provides for a process of recovering iridium by the method defined above followed by solvent extraction of the iridium from the eluate containing same.

A two-stage process for the recovery of iridium from its solution containing impurities including rhodium and base metals is now described. The overall sequence of the process is as follows:

1. The iridium containing solution is made acidic with HCl, the preferred HCl concentration being about 6M. The iridium is then oxidised to the +IV oxidation state at a temperature of about 40° C. Chlorine is the preferred oxidant.
2. The oxidised solution is passed through a bed of ion exchange resin at a flow rate of not more than 1 ml/cm$^2$/min. A strong base resin is preferred for this operation because of its resistance to oxidation. Amberlite IRA-400 (a Rohm & Haas product, sold under the Trade Mark Amberlite), is an example of a suitable commercially available resin.
3. After loading, the resin is washed with weak (0,1M) HCl to remove entrained feed solution, excess acid and weakly absorbed base metal impurities.
4. A saturated solution of $SO_2$ in water is passed through the washed resin bed. Simultaneous reduction and complexing of the iridium are believed to take place, with the formation of mixed sulphito-chloro complexes of the form Ir(111) $Cl_x(SO_3)_y$ where x is probably 4 and y is probably 2. Such complexation only takes place in the virtual absence of free hydrochloric acid. Other methods of eluting have used saturated $SO_2$ solutions of a dilute acid, usually hydrochloric acid. In these cases the sulphite ion acts as a reductant only and elution is inefficient as the iridium species formed is $IrCl_6^{-3}$ which is only slowly eluted from anion exchange resin.
5. The mixed sulphito-chloro complex can now be effectively and completely eluted from the resin using hydrochloric acid as the eluant. 6M HCl is the preferred eluant. The efficiency of the elution step is far superior to that obtained when simple reduction is used, and this is believed to be because the sulphito chloro complex formed in this method has a large negative charge ($-5$) and, as is well known, the distribution coefficient for retention of anions on anion-exchange resins is highly dependent of the charge on the anion; anions with low charge being absorbed much more readily than those with a high charge; thus $IrCl_6^{3-}$ would tend to be much more difficult to elute than Ir $Cl_4(SO_3)_2{}^{-5}$.

While very little iridium is removed from the resin during the treatment with $SO_2$-saturated water it may be recovered by combining this solution with the hydrochloric acid eluate and no difficulty is introduced by so doing other than the dilution of the eluate. It may, of course, be treated in any other suitable way to recover the iridium therein.

The iridium in the eluate is then converted to the Ir(IV) chloro-complex by a method involving the following steps:

1. Removal of the $SO_2$ and conversion of the chlorosulphito complex into the Ir(111) chloro-complex by boiling, and,
2. Oxidation of the Ir(111) to Ir(IV) in similar manner to that described above. As no extra cations e.g. $Na^+$ are introduced into the eluate, highly concentrated solutions of Ir suitable for solvent extraction or direct salt precipitation can be obtained.

The solvent extraction purification of the iridium can be performed with a number of known extractants. Of the available techniques, extraction with tributyl phosphate (50% in an aromatic diluent e.g. Solvesso 150 — a product of Esso Chemicals) appears to have the best performance and is easy to strip with weak acid e.g. 0,1M HCl. Applications of the above process are now described in the following examples.

EXAMPLE 1

This example demonstrates the high efficiency of the ion-exchange step in recovering iridium. A solution of 5.0 g/l Ir in 6M HCl was oxidised with chlorine for one hour at 40° C. and the solution was then cooled. A series of batch extractions was then performed using 50% tri-n-butyl phosphate (TBP) in Solvesso 150 as the extractant, with the following results:

|  | Concentration of Ir left in aqueous phase |
|---|---|
| 1st extraction | 1.5 g/l |
| 2nd extraction | 1.3 g/l |
| 3rd extraction | 1.25 g/l |
| 4th extraction | 1.25 g/l |

After 4 extractions only 75% of the iridium was extracted and it is apparent that in order to reduce the iridium concentration further the solution would have to be "re-conditioned" before repeating the solvent extraction. An identical solution was passed through a bed of Amberlite IRA-400 (see above) resin in a column. The results obtained from this experiment are reported below and are in sharp contrast to those obtained by solvent extraction:

| Bed Volume passed | Ir concentration in barren solution |
|---|---|
| 10 | 5 ppm |
| 15 | 7 ppm |
| 20 | 120 ppm |

It was observed from the results that the resin may be loaded to at least 75 g Ir/liter resin before any significant breakthrough occurred.

The ultimate capacity of the resin was found to be approximately 150 g Ir/liter resin. Breakthrough would obviously be obtained much before this level is achieved however, but, in practice, two columns in series would be employed and it appears possible that an iridium concentration of at least 120 g/l could be achieved in the leading column.

EXAMPLE 2

This example illustrates the efficiency of elution using the two-stage elution procedure outlined in Example 1 above. An iridium solution was passed through a resin bed until a loading on the resin of 60 g/l was achieved. The resin was then washed with 0.1M HCl (3BV) and $SO_2$-saturated water passed through the resin bed until the reduction/complexation reaction was complete. This is indicated by a change in resin bead colour from almost black to a pale orange. Two bed volumes of $SO_2$ solution were required to achieve this. The resin was then eluted with 4 bed volumes of 6N HCl. The various streams were then analysed for their iridium content, which was found to be distributed as follows:

0.1M HCl wash: 0.05%
$SO_2^-$ water: 0.80%
6N HCl eluate: 99.0%

Thus within the limits of analytical accuracy all of the iridium was accounted for, the vast bulk being in the HCl eluate.

EXAMPLE 3

This example illustrates the sequence of operations on a real feed solution. This solution contained the following concentrations of elements in 6N HCl:

Ir: 800 ppm
Rh: 12 g/l
Cu: 500 ppm
Ag: 50 ppm
Fe: 2.5 g/l
Al: 1.8 g/l

The solution was oxidised as described in Example 1 and 150 liters of the resultant solution was passed through a bed of 2 liters of Amberlite 400 resin. On analysis the barren solution was found to contain 5 ppm Ir; thus the retention of Ir by the resin exceeded 99%. After washing the resin with 10 liters of 0.1N HCl, about 8 liters of $SO_2$-saturated water was slowly passed through the column. The column was then eluted with 8 liters 6N HCl, the eluate combined with the $SO_2$—water eluate and boiled down to a volume of 5 liters. After oxidation the solution was analysed, the results being:

Ir: 23.8 g/l
Rh: 250 ppm
Cu: 5 ppm
Ag: 2 ppm
Fe: 3 ppm
Al: N.D.
Ni: N.D. (N.D. means "not detected").

The oxidised solution was then extracted with 50% TBP in Solvesso 150, the loaded organic washed with 6N HCl, and the iridium stripped with 0.1M HCl. 85% of the iridium was extracted with TBP in this case. The strip solution thus contained about 80% of the iridium in the original feed solution. This solution was analysed as follows:

Ir: 15.7 gpl
Rh: 3 ppm
Ag,Cu,Fe,Al,Ni: N.D.

It will be appreciated that the production of very high purity iridium metal from the solution via the conventional ammonium chloro-iridate precipitation and calcination route would be relatively simple.

What we claim as new and desire to secure by Letters Patent is:

1. A method of separating iridium from a solution thereof also containing rhodium the method comprising the steps of:
   (1) oxidizing the solution in the presence of hydrochloric acid to convert the iridium contained therein to the Ir(IV) oxidation state;
   (2) passing the solution into contact with an anion exchange resin to retain the oxidized iridium on the resin;
   (3) washing the resin with a dilute hydrochloric acid solution to remove any solution entrained therein;
   (4) contacting the washed resin with a substantially chloride free solution of sulphur dioxide in water thereby reducing the iridium to the Ir(III) oxidation state and simultaneously forming iridium sulphito-chloro-complexes;
   (5) eluting the resin with a hydrochloric acid solution to remove the iridium sulphito-chloro complexes therefrom;
   (6) boiling the resultant solution containing the iridium sulphito-chloro complexes to convert the iridium to the chloro-complex with the iridium in the Ir(III) oxidation state and to simultaneously remove sulphur dioxide; and
   (7) recovering the iridium from the solution resulting from step (6) above.

2. A method as claimed in claim 1 in which step (1) is conducted in the presence of about 6 molar hydrochloric acid.

3. A method as claimed in claim 1 in which step (1) is conducted at a temperature of at least about 40° C. using chlorine as the oxidant.

4. A method as claimed in claim 1 in which the anion exchange resin is a strongly basic anion exchange resin.

5. A method as claimed in claim 1 wherein the dilute hydrochloric acid of step (3) has a concentration of about 0.1 molar HCl.

6. A method as claimed in claim 1 in which a saturated solution of sulphur dioxide in water is used in step (4).

7. A method as claimed in claim 1 in which the elution of step (5) is conducted using a hydrochloric acid solution of about 6 molar.

8. A method as claimed in claim 1 in which the iridium is recovered including steps of:
   (8) oxidizing the iridium contained in the solution resulting from step (6) in the presence of hydrochloric acid converting iridium to the Ir(IV) oxidation state;
   (9) contacting the resultant solution with an organic phase containing a liquid solvent extractant and extracting the iridium into the organic phase; and,
   (10) stripping the organic phase with a dilute hydrochloric acid solution removing iridium from the resulting aqueous phase.

9. A method as claimed in claim 9 in which the liquid solvent extractant is tri-butyl phosphate.

* * * * *